Sept. 1, 1964 M. HOFFMAN 3,146,690
VACUUM FILM HOLDER

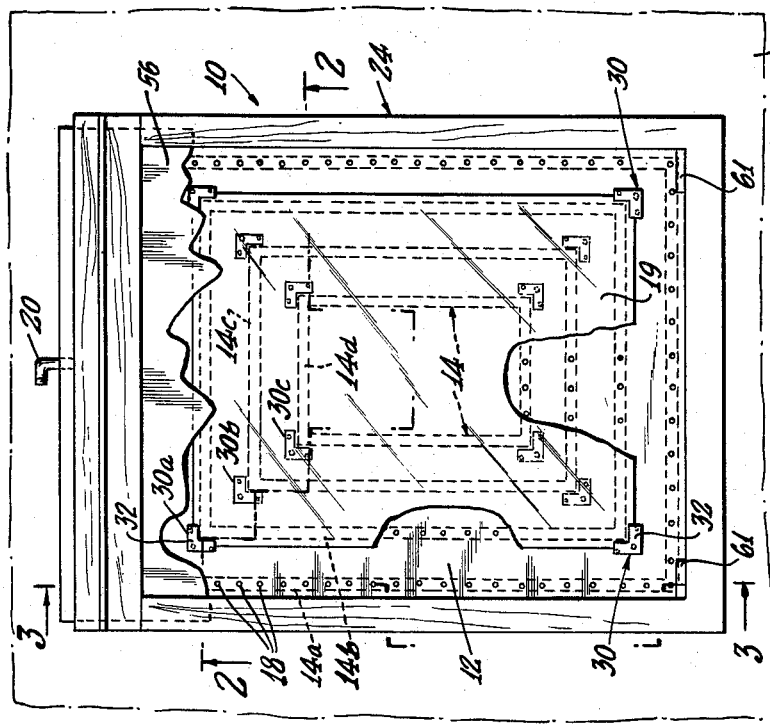

Filed Oct. 21, 1960 2 Sheets-Sheet 2

INVENTOR.
MORRIS HOFFMAN by Leonard H. King

United States Patent Office 3,146,690
Patented Sept. 1, 1964

3,146,690
VACUUM FILM HOLDER
Morris Hoffman, 240 Jerusalem Ave., Hicksville, N.Y.
Filed Oct. 21, 1960, Ser. No. 64,079
8 Claims. (Cl. 95—69)

This invention relates to improvement in vacuum film holders and comprises such a holder adapted to retain all portions of any size film smaller than the holder against the surface of the front plate thereof. It is designed primarily for use in cameras employed in the graphic arts for holding sensitized photographic materials, films, glass plates, paper or thin metal sheets in a perfectly flat focal plane of the camera lens. It may also be employed to hold X-ray plates for radiographic work.

In certain photographic work, the requirements of precision necessitate that the support for the photosensitive material be of the vacuum type wherein the photosensitive medium is firmly held by suction against the support, insuring flatness of the sheet. It is conventional practice in the art to employ such a vacuum back as part of a camera and most commonly, it is in the form of a hinged back. For convenience, the back of the camera is enclosed in a darkroom so that the photosensitive medium may be loaded into the back and vacuum applied to hold it in place. The front part of the camera, or lens portion, is usually in another room where the material to be photographed may be arranged under conditions of light. In the alternative, all of the studio must be blacked out in order to load the camera if no darkroom is provided. It will be appreciated that because of the darkroom requirements, considerable space is occupied by the camera and if several operators are working with separate cameras, separate darkrooms, or loading rooms, must be provided.

The apparatus of this invention comprises a portable holder for the photosensitive material. A number of such holders may be loaded in a darkroom which darkroom may be utilized in common by the operators of a number of cameras, the cameras all being located in a common illuminated room.

In keeping with this invention, a vacuum film holder is provided with mechanical holding means for holding the film in accurate register without vacuum being applied. The film holder may be provided with a slide to shield the film from sources of light. The film holder is then inserted into the spring back of a conventional camera and vacuum applied to insure that the film is perfectly flat. The slide is then removed, and assuming that the camera is so adjusted as to be in proper focus, the exposure is made.

Accordingly, it is an object of this invention to provide a vacuum film holder having auxiliary manual clamping means.

It is another object of this invention to provide a vacuum film holder having a plurality of adjustable film clamping means.

A further object of this invention is to provide a film holder which due to its simplicity, may be quickly attached to any camera.

A further object of this invention is to provide a vacuum film holder which may be loaded with film and include means for retaining the film in position in the absence of a vacuum.

A still different object of this invention is to provide a vacuum film holder having means to fixedly secure a film sheet in position without the application of vacuum for purposes of transporting the loaded film holder.

Another feature of the invention is that it permits the use of a standard spring back camera as a vacuum back camera.

Still other objects and features of this invention will be in part pointed out with particularity and will in part become obvious after a consideration of the accompanying drawings taken in conjunction with the following specification of a preferred embodiment of the invention.

In the drawings:

FIG. 1 is a front elevation of an improved film holder with a film sheet inserted, but unclamped, with a portion of the film shown broken away.

FIG. 2 is a cross-sectional view taken along the line 2—2 of FIG. 1. A portion of the view is shown magnified for greater clarity.

FIG. 3 is a cross-sectional view taken along the line 3—3 of FIG. 1.

Figure 5:
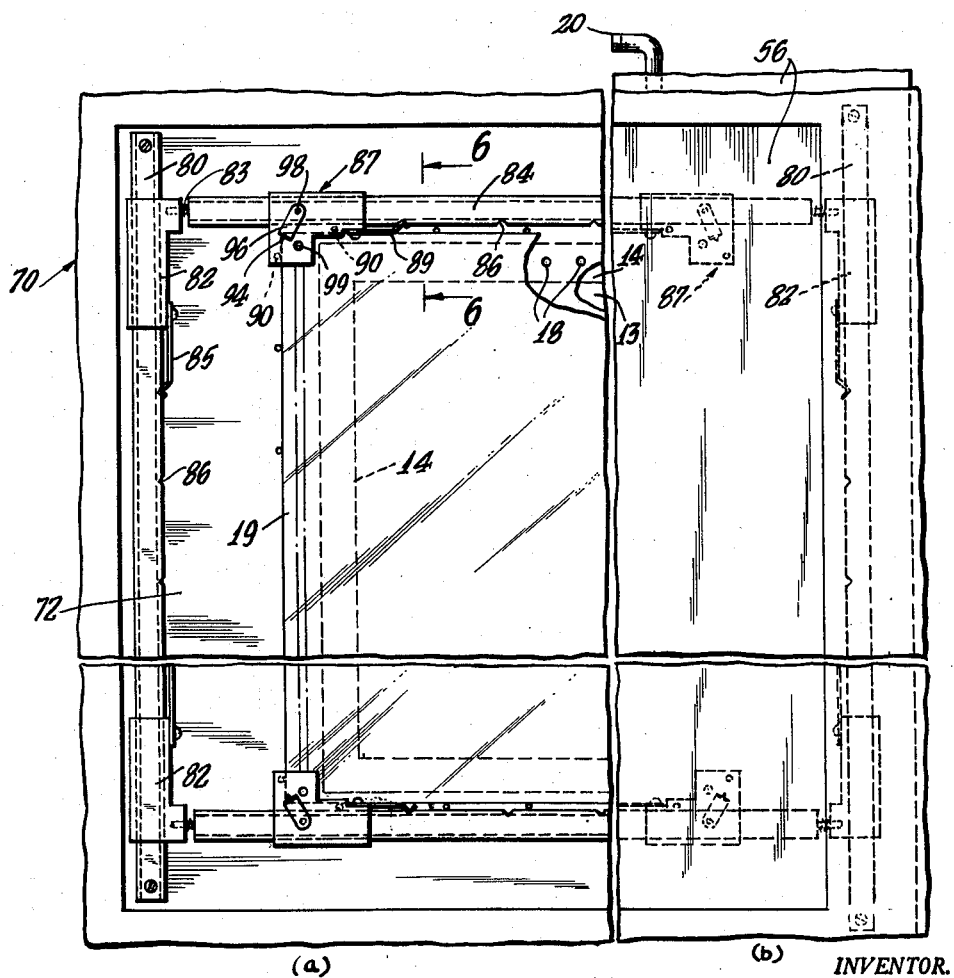

FIGS. 5a, 5b show the left and right portions respectively of another embodiment of this invention. FIGS. 5a and 5b represent minor variants of the same embodiment. In FIG. 5b the protective slide is shown in the closed position.

FIG. 6 is an enlarged cross-sectional view taken along the line 6—6 of FIG. 5a.

FIG. 7 is an elevation partially broken away showing a punch.

In the drawings, wherein like characters of reference generally indicate like parts throughout, 10 generally indicates a vacuum film holder constructed in accordance with my invention.

The film holder 10 includes a front plate 12 and a backing plate 13. Recessed into a plywood backing plate there is provided a series of endless, rectangular, nested channels 14, comprising respective channels 14a, 14b, 14c, and 14d, said endless channels being of respectively smaller sizes than standard film sizes. Evenly spaced perforations 18 are provided in front plate 12, each respective channel extending to the surface of said front plate to provide suction of equal intensity along said aligned perforations, drawing the film 19 against front plate 12.

Figure 4:
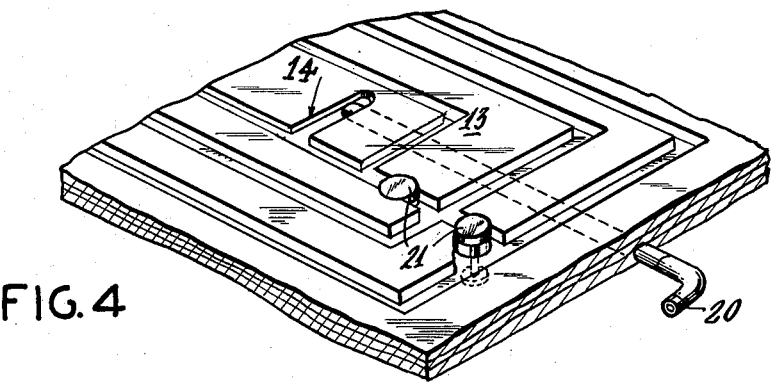
FIG. 4 is a broken away perspective view of the plate holder showing the vacuum channels and valve means.

Coupling 20 provides means for insertion of a vacuum hose leading from an exhaust pump (not shown). Valve means 21 (FIG. 4) may be provided for cutting off unused channels 14. Such shut-off devices are well known in the vacuum holder art and need not be more fully described herein. In the absence of such devices, the operator will mask with paper the portion of the holder not covered by the film. The plates 12 and 13 are secured in a frame 24. The frame 24 may be made of relatively heavy material such as a 1" milled birch frame. The front and back plates 12 and 23 respectively are preferably aluminum plates having a thickness of about 1/16 inch. The plywood backing plate may be 1/4" thick. These dimensions are provided by way of illustration of a currently preferred embodiment and are not to be regarded as limiting.

While this invention may be adapted to film holders of various sizes, for purposes of illustration, and likewise without intent to be limiting, the description will be directed to a typical holder designed to take sheets of photographic material ranging in size from 11" x 14" to, say, 20" x 24" in three increments. Thus, as will be seen by reference to FIG. 1, four series of perforations are provided. At the corner of each there is located a set of clamps 30 deisgnated 30a, 30b, 30c and 61. As shown in the drawing, said clamps 30a are employed to receive a 16" x 20" sheet. Clamps 30 comprise an L-shaped clamping member 32, which is normally recessed flush with the surface of member 12. The L-shaped member is supported by a post 34 which slides in a bore extending through members 12 and 13. One end of the post 34 is provided with a pivoted lever 36. Assuming the device is to be used for an 11" x 14" sheet, then members 30c would be utilized as the clamping means. Clamps 61 are fixed to receive the largest size film the holder accommodates.

The operator in the darkroom would open levers 36a and set the holders with levers 36a supporting the holder on table top 40. The weight of the holder 10 would force pins 34 upwardly against the action of compression spring 42 acting against pin 48. As shown in FIG. 2 the entire weight of the frame 10 is supported slightly above the table by the force of springs 42. If softer springs are employed, the frame will rest directly on the table. The film is inserted into the four clamps and is accurately positioned therein by means of a pair of guide pins 50 extending downwardly from clamping member 32 into mating recesses 54.

After the film has been inserted, the holder is lifted off the table and the compression spring acts against pin 48 to draw members 32 downwardly and clamp film 19 tightly against the holder. Slide 56 is then inserted to enclose the loaded film. The holder may now be taken from the darkroom and inserted into the camera under conditions of light.

Referring now to FIGS. 5a, 5b, and 6, still another embodiment of this invention is disclosed therein. This embodiment comprises a vacuum frame including an outer supporting frame 70, a perforated plate 72, and conventional channeled plate 13, having the channels aligned with the rows of perforations of plate 72. A coupling 20 is provided to provide means for coupling a source of vacuum to the channel. Means well known to the art may be provided for selectively cutting off undesired rows of perforations. There is provided a pair of rigidly fixed rods 80 which may be concealed as shown in FIG. 5b or left exposed as in FIG. 5a. Sliding on each of the rods, there is provided a pair of sleeve members 82. A guide member 84 is pivoted between opposite pairs of sleeve members 82. The sleeve members 82 are sufficiently long to assure that guide member 84 will travel at right angles to rod 80. Springs 85 and 89 engage notches 86 locating along rods 80 and 84, respectively, to positively locate the holders at proper positions for film sheets of various sizes. In operation, the members 82 and 87 are moved to the desired clamping positions and the spring detents 85 and 89 engage their mating notches. Members 87 are then lifted pivoting upwardly together with 84 acting on pivot pins 83. The film is inserted in the clamping means 87 which are then lowered into place. Locating pins 90, which seat into holes in plate 72, assure accurate location of the film.

For the purpose of accurate registry of the film as, for example, in the making of color separation negatives, a spring loaded pin is provided. This pin 94 extends downwardly from leaf spring 96. The spring is arranged to pivot about pin 98 and moved in an arcuate fashion until pin 94 is over opening 99. The pin is then pushed through the film to mark the location. A recess in plate 72 receives the end of the pin. One feature of this design is that pins 90 are raised out of the plane of member 72 thereby avoiding the scratching of the surface during the adjusting procedure.

In certain other systems for color registration practised in the graphic arts, it is conventional to punch a location hole in the outer periphery of the film. For this purpose, the punch 91, shown in FIG. 7, may be inserted in the bore 99 and forced through the film to form a registry hole.

What is claimed is:
1. A holder for flexible sheet material, such as photographic film, adapted for removal from a camera for loading with said material, said holder including a frame supporting a facing member having a flat front face adapted to receive said material and provided with openings distributed thereover for the application of suction to the material placed against said flat face; manifold means at the rear of said member for applying suction to said openings;
   a plurality of sets of clamping means said sets arranged in a series of nested rectangles;
   a spring loaded pin member fixed to each of said clamping members and extending through said holder;
   extendable leg portions pivoted from each of said pin members so as to permit selectively extending said pin members beyond said holder whereby when said holder is placed flat on a base, the weight of said holder on the said selectively extended pins will force its associated clamps up above the surface of said front face, said clamping means being normally recessed in said front face.

2. The apparatus of claim 1 wherein said holder includes one set of fixed clamps for securing a sheet of the largest size said holder can accommodate.

3. The apparatus of claim 1 wherein said clamping means carry locating pins for positioning said sheet material.

4. A portable vacuum type film holder for thin, flexible, energy sensitive, standard size rectangular sheet film said holder being adapted for insertion into a camera and for retention therein by means of interfitting parts, comprising, in combination:
   a frame;
   a facing member secured within said frame, said facing member having a flat, front surface provided with apertures thereover for the application of suction to hold said sheet film placed thereon against said facing member front surface;
   manifold means at the rear of said facing member and cooperating therewith for applying suction to said apertures;
   pre-positioned holding means arranged to hold said sheet film on all sides proximate to said facing plate in the absence of suction; and
   a light retarding shield adapted to be slidably inserted in said frame for covering said sheet film and in close proximity thereto.

5. The device of claim 4 including sets of clamping means arranged to define a plurality of rectangular patterns corresponding to standard sheet film sizes.

6. The device of claim 5 wherein the sets of clamping means are arranged to define a plurality of rectangular patterns and wherein a pattern of relatively large dimension encloses a pattern of somewhat smaller dimension.

7. The device of claim 4 wherein said apertures and said manifold means are arranged to define rectangular patterns, each of said manifold patterns dimensioned and positioned so as to be cooperatively associated with a similarly sized and positioned clamping means pattern.

8. The device of claim 4 wherein said holding means are resiliently biased with respect to said facing plate to clamp said sheet film to said facing plate.

References Cited in the file of this patent
UNITED STATES PATENTS

| | | |
|---|---|---|
| 600,688 | Goodwin | Mar. 15, 1898 |
| 1,576,118 | Hahn | Mar. 9, 1926 |
| 2,078,741 | Stenmark | Apr. 27, 1937 |
| 2,562,312 | Gregory | July 31, 1951 |